United States Patent [19]

Sawada et al.

[11] Patent Number: 5,248,532
[45] Date of Patent: * Sep. 28, 1993

[54] AIR BAG-CONTAINING COVER

[75] Inventors: Masami Sawada; Takayasu Zushi, both of Shiga; Mitsuo Yoshiyasu, Chiba, all of Japan

[73] Assignee: Takata Corporation, Tokyo, Japan

[*] Notice: The portion of the term of this patent subsequent to May 5, 2009 has been disclaimed.

[21] Appl. No.: 623,338

[22] Filed: Dec. 7, 1990

Related U.S. Application Data

[63] Continuation-in-part of Ser. No. 453,685, Dec. 20, 1989, Pat. No. 5,110,647.

[30] Foreign Application Priority Data

Dec. 18, 1989 [JP] Japan .................. 1-327580

[51] Int. Cl.$^5$ ............................................. B60R 21/16
[52] U.S. Cl. ................................. 428/35.2; 428/35.4; 428/43; 428/217; 428/516; 428/517; 428/519; 280/728; 280/743
[58] Field of Search ........................ 280/728, 731, 743; 428/35.2, 515, 35.4, 516, 517, 519, 217, 43

[56] References Cited

U.S. PATENT DOCUMENTS

| | | | |
|---|---|---|---|
| 4,752,083 | 6/1988 | Honda | 280/731 |
| 4,877,264 | 10/1989 | Cuevas | 280/734 |
| 5,002,307 | 3/1991 | Heidorn | 280/731 |

FOREIGN PATENT DOCUMENTS

| | | |
|---|---|---|
| 43-6636 | 3/1968 | Japan . |
| 50-43454 | 5/1975 | Japan . |
| 50-127336 | 10/1975 | Japan . |
| 51-25342 | 2/1976 | Japan . |
| 52-76042 | 6/1977 | Japan . |
| 52-80928 | 6/1977 | Japan . |
| 42-8704 | 2/1987 | Japan . |
| 62-234764 | 10/1987 | Japan . |

OTHER PUBLICATIONS

JIS K6301—75—Oct. 17, 1983.
JIS K7203—82—Feb. 7, 1987.

Primary Examiner—George F. Lesmes
Assistant Examiner—Rena L. Dye
Attorney, Agent, or Firm—Kanesaka and Takeuchi

[57] ABSTRACT

An air bag-containing cover comprising:
a soft surface skin layer made of a thermoplastic polymer containing the following ingredients A, B, C and D:
  ingredient A: a hydrogenated derivative of a block copolymer comprising styrene an conjugated diene,
  ingredient B: an olefinic resin,
  ingredient C: polyisobutylene with a viscosity average molecular weight of not greater than 70,000, and
  ingredient D: a hydrocarbon series rubber softening agent with a kinetic viscosity at 40° C. of not greater than 500 cSt and/or polybutene with a number average molecular weight of not greater than 2500, in which blending ratio is:
  ingredient A=40 to 80% by weight,
  ingredient B=5 to 30% by weight
  ingredient C=2 to 30% by weight
  ingredient D=0 to 20% by weight, and having a JIS-A hardness according to JIS-K6301 of from 20 to 90, and
a rigid core layer comprising an olefinic resin having a modulus in flexure according to JIS-K7203 of from 1000 to 7000 kg/cm$^2$, in which
the core layer has a higher hardness than that of the surface skin layer, and the core layer has a portion for easily bursting the cover upon initiation of the air bag operation.

18 Claims, 2 Drawing Sheets

AIR BAG-CONTAINING COVER

CROSS REFERENCE TO RELATED APPLICATION

This is a continuation in part application of Ser. No. 453,685 filed on Dec. 20, 1989, now U.S. Pat. No. 5,110,647.

FIELD OF THE INVENTION AND RELATED ART STATEMENT

The present invention concerns a cover for containing an air bag which is actuated to expand and develop upon collision of a vehicle by sensing impact shock, deformation or the like caused by the collision.

The air bag-containing cover of this kind is generally inserted with a reinforcing material such as nets (refer, for example, to Japanese Patent Laid-Open Sho 62-234764, Sho 50-127336, Japanese Utility Model Laid-Open Sho 52-80928, Sho 50-43454 and Sho 51-25342).

The cover inserted with the net-like inserts is usually manufactured by preparing an entire cover with a material of relatively low strength such as foamed polyurethane and inserting the reinforcing nets for the entire cover. Lines not inserted with the reinforcing nets are generally provided so that the air bag can be developed smoothly upon expansion to easily break the cover.

On the other hand, Japanese Utility Model Laid-Open Sho 52-76042 proposes an air bag-containing cover comprising two layers, that is, a surface skin layer made of rigid urethane foams for finely finishing the surface and a core layer made of low density (high foaming ratio) urethane foams for softening the entire cover in which slits (lines for smoothly developing the air bag upon expansion) are disposed to extend from the core layer to a portion of the surface skin layer.

Among the conventional air bag-containing covers described above, the air bag-containing cover provided with the net-like inserts involves a problem that its manufacture requires a number of steps and is troublesome, manufacture at high accuracy is difficult even by the use, for example, of urethane foaming molding (RIM), the production yield is low and the cost is expensive since the net-like reinforcements are inserted.

Further, the cover as disclosed in Japanese Utility Model Laid-Open Sho 52-76042 has a surface skin layer made of rigid urethane foams (ASTM-D2240, Shore hardness: 30-40) and, accordingly, it can not provide a soft feeling but gives unpleasant feeling when a portion of a driver's body is in contact therewith, for instance, during running of a vehicle. Furthermore, since the urethane material has low impact shock strength and no reinforcing inserts are provided, broken pieces are scattered upon expansion of the air bag.

OBJECT AND SUMMARY OF THE INVENTION

The object of the present invention is to overcome the foregoing problems of the air bag-containing cover in the prior art and to provide an air bag-containing cover of such a performance that a surface skin layer is flexible and gives a soft feeling, a core layer retains a shape capable of withstanding external pressure, the cover is easily broken upon expanding operation of the air bag but is not scattered in broken pieces within a temperature range from $-40°$ C. to $+80°$ C., and also shows satisfactory breaking performance without changing of appearance at the above-specified temperature range even after a long time at a high temperature of $110°$ C. and 1000 hours in view of actual mounting to a vehicle, which can be supplied by means of a simple molding process such as injection molding, at a high yield, at high accuracy, at high productivity and with satisfactory economical advantage.

The air bag-containing cover according to the present invention comprises:

a surface skin layer made of thermoplastic polymer containing the following ingredients A, B, C and D, ingredient A: a hydrogenated derivative of a block copolymer comprising styrene and conjugated diene, ingredient B: an olefinic resin, ingredient C: a polyisobutylene with a viscosity average molecular weight of not greater than 70,000 and ingredient D: a hydrocarbon series rubber softening agent with a kinetic viscosity at $40°$ C. of not greater than 500 cSt and/or a polybutene with a number average molecular weight not greater than 2500, in which the blending ration is:

ingredient A=40 to 80% by weight.
ingredient B=5 to 30% by weight
ingredient C=2 to 30% by weight
ingredient D=0–20% by weight, and having JIS-A hardness in accordance with JIS-K6301, i.e. a hardness determined by a test piece of type A in Hardness Test of Japanese Industrial Standard No. K6301 (Physical Testing Method for Vulcanized Rubber), of from 20 to 90, and a core layer made of an olefinic resin having a modulus in flexure in accordance with JIS-K7203, i.e. Japanese Industrial Standard No. K7203 (Testing Method for Flexural Properties of Rigid Plastics), of from 1000 to 7000 kg/cm$^2$, in which the core layer has a higher hardness than that of the surface skin layer and the core layer is provided with easily bursting or tearing portions upon initiation of the air bag operation.

The present inventors have made earnest studies for attaining the foregoing object and, as a result, have accomplished the present invention based on the finding that the above-mentioned object can be attained by using a specific surface skin layer and a specific core layer and providing the core layer with easily bursting portions, for example, embrittled shapes.

In the air bag-containing cover according to the present invention, since the relatively rigid core layer is covered with the soft surface skin layer, it provides softness and gives no unpleasant feeling when a driver's body is in contact with the cover. Further, since the core layer is rigid, the cover is neither deformed nor broken even when a certain external force is exerted.

In the cover according to the present invention, when the air bag in the cover is expanded, for instance, upon collision of a vehicle, within a temperature range from $-40°$ C. to $+80°$ C., the cover is bursted along the cover bursting embrittled shapes previously disposed to the core layer. Upon bursting of the cover, since the rigid core layer is covered with the soft surface skin layer in close contact therewith, broken pieces of a cover upon bursting are not scattered.

Furthermore, the cover according to the present invention shows satisfactory breaking performance and shows scarce change in the appearance within the above-mentioned temperature range ($-40°$ C.$-+80°$ C.) even after the elapse of 500 hours at $110°$ C. which are taken into consideration as actual mounting conditions to a vehicle.

DESCRIPTION OF THE PREFERRED EMBODIMENTS

The present invention will now be described more in details.

Figure 1:
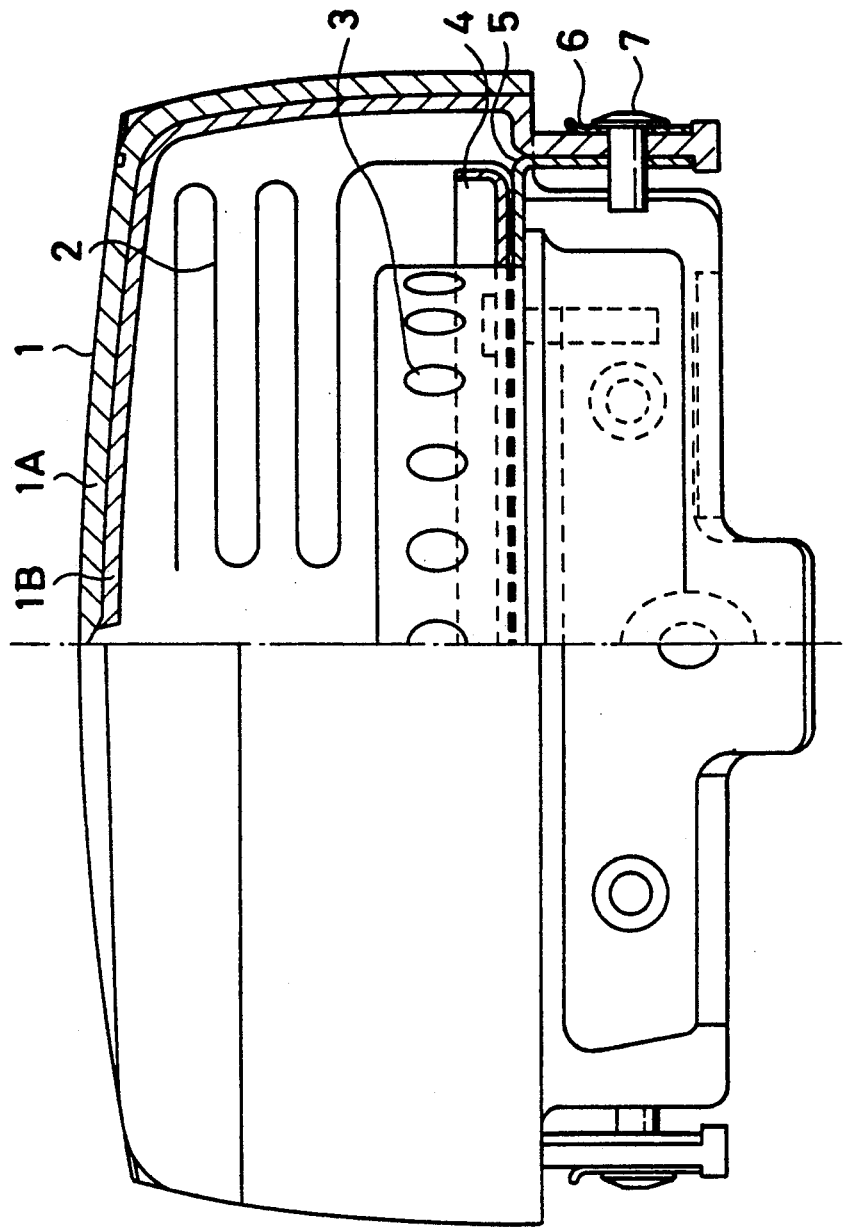
FIG. 1 is a schematic front elevational view partially in cross section illustrating an air bag-containing cover as a preferred embodiment according to the present invention in a state attached to an air bag and FIG. 2 is a rear elevational view of the air bag-containing cover.
Figure 2:
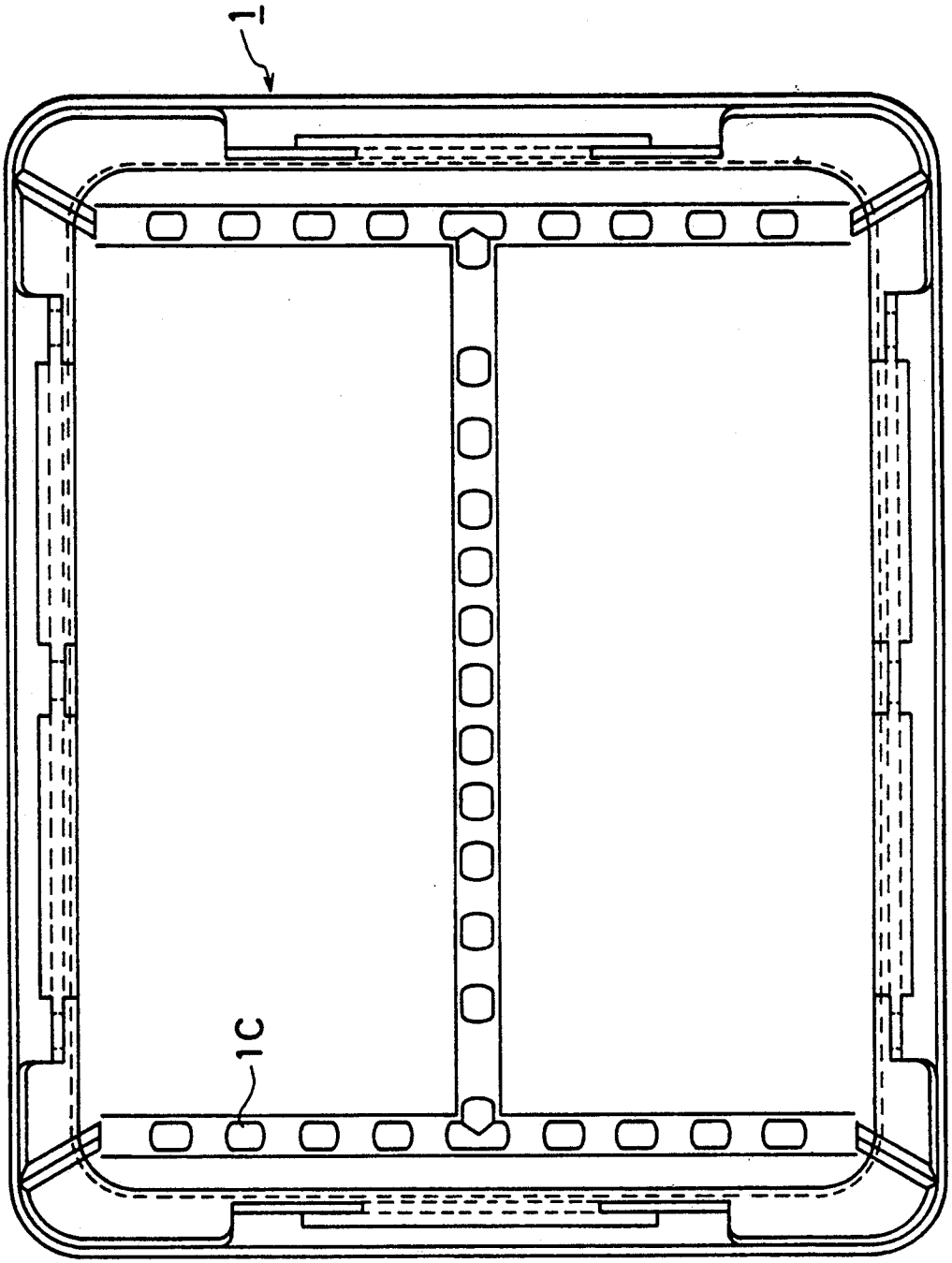

FIG. 1 is a schematic front elevational view partially in cross section illustrating an air bag-containing cover as a preferred embodiment according to the present invention in a state attached to an air bag and FIG. 2 is a rear elevational view of the air bag-containing cover.

In the drawings, are shown an air bag-containing cover 1, an air bag 2, an inflator 3, a ring retainer 4, a base retainer 5, a plate 6, a rivet 7, a surface skin layer 1A, a core layer 1B and continuous stitch-like slits 1C.

As shown in the drawings, the air bag-containing cover according to the present invention uses, as the surface layer 1A, a surface skin layer made of a thermoplastic polymer (thermoplastic elastomer) containing the following ingredients A-D in the following blending ratio and having JIS-A hardness in accordance JIS-K630 of from 20 to 90;

Ingredient A: a hydrogenated derivative of a block copolymer comprising styrene and conjugated diene=48 to 80% by weight, Ingredient B: an olefinic resin=5 to 30% by weight, Ingredient C: a polyisobutylene with a viscosity average molecular weight not greater than 70,000=2 to 30% by weight, Ingredient D: a hydrocarbon series rubber softening agent with a kinetic viscosity at 40° C. of not greater than 500 cSt and/or a polybutene with a number average molecular weight not greater than 2500=0 to 20% by weight.

While, a core layer made of an olefinic resin having a modulus inflexure in accordance with JIS-K7203 of from 1000 to 7000 kg/cm² is used as the core layer 1B.

The core layer 1B has a higher hardness than that of the surface skin layer 1A, and the core layer 1B is provided with embrittled shapes 1C, for example, notch-like reduced thickness shapes or stitch-like slit shapes as the easily bursting portions upon initiation of the air bag operation.

In the present invention, as the ingredient A of the thermoplastic elastomer used as the constituent material for the surface skin layer 1A, there can be mentioned a hydrogenated derivative of a styrenic block copolymer typically represented, for example, by the general formula:

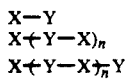

where X represents a styrene polymer block, Y represents a conjugated diene elatomeric polymer and n is an integer of 1 to 5.

As the monomer of the conjugated diene for the polymer block Y in each of the formulae, butadiene or isoprene is suitable and a mixture thereof may also be used. Further, the ratio of the ingredient A of the styrene polymer block X in the entire block copolymer is usually ranges from 5 to 40% by weight and, preferably, from 10 to 35% by weight. If the ratio is less than 5% by weight, the surface skin layer is deteriorated in the mechanical strength, easily broken upon expansion of the air bag and deformed by the external pressure to leave the traces thereof. On the other hand, if it exceeds 40% by weight, it is not practical since the soft feeling of the surface skin layer is poor.

It is preferred that the number average molecular weight of the polymer block X is within a range from 5000 to 125,000 and the number average molecular weight of the polymer block Y is within a range from 15,000 to 250,000.

Various methods have been proposed for the preparation of the hydrogenated derivative of the styrenic block copolymer represented by the general formula described above, and there can be mentioned typical methods as described, for example, in Japanese Patent Publications Sho 42-8704 and 43-6636.

In the present invention, the hydrogenated derivative in which at least 50%, preferably, more than 80% of the olefinic double bonds in the polymer block Y are hydrogenated and less than 25% of the double bonds in the polymer block X are hydrogenated upon preparation are preferred as the ingredient A. As for the block polymer, commercially available polymer, for example, KRATON-G (Shell Chemical Co.), KL (Kurare Co.) and TAFTEC (Asahi Kasei Co.) can be used.

As the ingredient B, a homopolymer or copolymer of α-olefin such as ethylene, propylene and butene-1 is preferred.

As the ingredient C, a high molecular weight polyisobutylene which does not substantially have double bonds in the molecular chain and having a bonding structure:

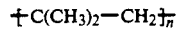

is preferred. The polyisobutylene for the ingredient C has a viscosity average molecular weight of not greater than 70,000 and, preferably, not greater than 50,000. If the viscosity average molecular weight exceeds 70,000, it is not preferred since this brings about a disadvantage that the resultant surface skin layer is poor in the soft feeling and moldability. As a polyisobutylene suitable for the ingredient C, commercially available polymer, for example, TETRAX (Nippon Petrochemical Co.) and BISTANEX (Exon Chemical Co.) can be used.

The ingredient D is a hydrocarbon series rubber softening agent with a kinetic viscosity at 40° C. of not greater than 500 cSt, specifically paraffinic or naphthenic extender oil or process oil and/or a polybutene with a number average molecular weight of not greater than 2500, preferably, not greater than 2,000, suitably, mainly comprising isobutylene and partially copolymerized with n-butene.

If the kinetic viscosity of the hydrocarbon series rubber softening agent for the ingredient D exceeds 500 cSt, this result in a disadvantage that the moldability of the surface skin layer material is deteriorated. On the other hand, if the molecular weight of the polybutene exceeds 2500, it also leads to a disadvantage of poor moldability.

The ingredient D may be a mixture of a hydrocarbon series rubber softening agent and a polybutene.

In the present invention, the blending ratio of the ingredients A–D is as shown below:

Ingredient A = 40 to 80 wt %, preferably, 60 to 75 wt %

Ingredient B = 5 to 30 wt %, preferably, 10 to 20 wt %

Ingredient C = 2 to 30 wt %, preferably, 5 to 20 wt %

Ingredient D = 0 to 20 wt %, preferably, 0 to 15 wt %.

If the styrenic block polymer of the ingredient A is less than 40% by weight, the resultant surface skin layer lacks in the soft feeling. On the other hand, if it exceeds 80% by weight, the resultant thermoplastic elastomer has poor moldability.

If the olefinic resin of the ingredient B is less than 5% by weight, the molding stability of the resultant thermoplastic elastomer and the adhesion between the surface skin layer and the core layer are poor. On the other hand, if the exceeds 30% by weight, the soft feeling of the resultant surface skin layer is poor.

If the polyisobutylene as the ingredient C is less than 2% by weight, the soft feeling and the moldability are poor. If it exceeds 30% by weight, it is not preferred since the surface becomes sticky and physical strength is deteriorated.

If the hydrocarbon series rubber softening agent and/or polybutene as the ingredient D exceeds 20% by weight, it leads to undesirable appearance (deformation) or the like after elapse of 1000 hours at 110° C. and causes failure upon breaking, that is, breakage at the portions other than predetermined embrittled portions or scattering of broken pieces upon expansion of the air bag at −40° C.

In the present invention, a thermoplastic polymer constituting the surface skin layer 1A having JIS-A hardness of 20 to 90 is selected. If the hardness is less than the above-specified range, the moldability (for example, injection moldability) and mechanical strength are poor, which results in easy destruction although the flexibility is satisfactory. On the other hand, if the hardness exceeds the above-mentioned range, it is not practical although since the soft feeling is poor, there is no problems in the moldability. The selected hardness within a range from 20 to 90, although varying depending on the thickness of the surface skin layer, is preferably within a range from 30 to 70 and, more preferably, from 40 to 65.

The thermoplastic elastomer comprising the ingredients A–D for the surface skin layer 1A in the present invention can be prepared by a mechanical melt-kneading. Specifically, usual melt-kneaders such as banbury mixer, various kinds of kneaders and extruders can be used. In the present invention, the constituent materials for the surface skin layer may comprise in addition to the ingredients A–D, various kinds of other resins, elastomers, various kinds of fillers such as glass fibers, talc, calcium carbonate, silica and mica, pigments and stabilizers filled by a customary method, so long as the hardness is kept within the above-mentioned range.

The thickness of the surface skin layer 1A usually varies depending on the portions of the cover 1 and it is not quite uniform over the entire area. In the present invention, it is preferred that those portions of more than 70%, preferably, more than 80% of the surface area of the surface skin layer 1A have a thickness of greater than 0.5 mm. Although there is no particular restriction for the upper limit of the thickness, it is appropriate to keep the thickness to less than about 10 mm, for example in view of the design, economical property, soft feeling, operation performance and moldability of the air bag.

Further, with an aim of improving the soft feeling and reduction of the weight of the surface skin layer 1A, foaming at a ratio of less than about 3.0 times may be applied.

In the present invention, for the olefinic resin used as the constituent material for the core layer 1B and having a modulus in flexure according to JIS-K7203 of 1000 to 7000 kg/cm$^2$ and having a higher hardness than that of the thermoplastic polymer for the surface skin layer 1A is, preferably, a homopolymer or a copolymer of α-olefins, for example, ethylene and propylene. They may be used alone or as a blend of two or more of them. Furthermore, an elastomer, for example, an olefinic rubber comprising ethylene and α-olefin may be added to the olefinic resin with an aim of improving the softness, cold impact shock resistance or the like, so long as the modulus in flexure and the hardness are within the above specified range. Further, various kinds of other resins, elastomers, various kind of fillers such as talc, calcium carbonate, silica or mica, pigments and stabilizers may be filled by a customary method so long the modulus and hardness are within the above-mentioned range.

In a case where the elastomer is contained in the material for the core layer 1B, the content is preferably not greater than 60% by weight. If the elastomer exceeds 60% by weight in the blending composition there rises a problem in the moldability and the shape retainability.

In the present invention, if the olefinic resin constituting the core layer 1B has modulus flexure of not greater than 1000 kg/cm$^2$ or hardness lower than that of the thermoplastic elastomer for the surface skin layer 1A, it can not provide sufficient shape and is easily deformed by external pressure and, accordingly, not suitable as an air bag-containing cover. On the other hand, if the modulus in flexure exceeds 7000 kg/cm$^2$, the entire softness of the dual layer air bag cover is poor and the failure is liable to occur upon air bag operation at −40° C. Accordingly, the modulus in flexure is preferably greater than 1000 kg/cm$^2$ and less than 7000 kg/cm$^2$, particularly, 2000 to 5000 kg/cm$^2$ in view of the soft feeling, operation characteristics and shape retainability of the entire cover.

There is no particular limit to the thickness of the core layer 1B and it is generally about 0.5 to 5 mm and, preferably, 1 to 3 mm.

In the present invention, the core layer 1 constituted with such a thermoplastic resin is provided with embrittled shapes in order that the core layer 1B is bursted upon initiation of the air bag operation. As the embrittled shapes, there can be used continuous stitch-like slit shapes 1C, as well as various kinds of shapes such as notch-like shapes of reduced thickness. Further, there is no particular restriction to the position or range for forming the shapes, which may properly be determined depending on the shape and the strength of the core layer 1B and the stresses caused upon air bag operation.

Then, description will now be made to the method of manufacturing an air bag-containing cover according to the present invention.

As the molding method for manufacturing the air bag-containing cover according to the present invention, usual molding methods adopted for thermoplastic resins can be mentioned and, in particular, injection molding method is preferred in view of the design or the like.

As the injection molding method, there can be mentioned, for example, a so-called insert injection method which comprises previously molding a core layer, placing the molding product to a die leaving a space for the surface skin layer and injection molding a surface skin material comprising a thermoplastic polymer to the surface skin layer portion, or a so-called double injection method which comprises molding a core layer, separating a cavity die, putting a new cavity die having a space for a surface layer successively without taking the core molding product from the die and then injection molding the surface skin material.

In this case, it is necessary that the above-mentioned embrittled shapes are formed to the core layer 1B so that air bag is easily bursted upon initiation of the operation. As the embrittled shapes, there can be mentioned notch-like shapes of reduced thickness or continuous stitch-like slit shapes, etc. as described above. The shapes may be applied by molding the cover molding product with a die having such shape, or by applying fabrication of providing such shape and then laminating a surface skin layer thereover after molding the cover.

In the air bag cover according to the present invention, the surface skin layer 1A may be applied with coating, if necessary, for providing gorgeousness in a vehicle chamber and improving color matching with other interior parts and feeling. Coating of the surface skin layer 1A is also preferred in view of scratch resistance.

As has been described above specifically, since the surface layer in the air bag containing cover according to the present invention is soft, it provides a comfortable feeling due to its softness when a portion of a driver's body touches to the cover. Further, since the core layer is relatively hard, it is excellent in the shape retainability and highly durable. Then, upon operation of the air bag, the cover is rapidly bursted due to the cover-bursting embrittled shapes. In addition, scattering of the core layer upon bursting of the cover can surely be prevented due to the soft surface skin layer and the cover exhibits preferable breaking performance and it is excellent in endurance.

In addition, the air bag-containing cover according to the present invention can be manufactured, for example, by a rationalized molding process such as a double injection method, simply, at high accuracy, with no occurrence of failed products, at high yield, effectively and efficiently, which enables remarkable cost down of the resultant products.

The present invention will now be explained more specifically referring to examples and comparative examples, but it should be noted that the present invention is not restricted only to the following examples unless it goes beyond the scope of the invention.

EXAMPLES 1-7

Comparative Examples 1-6

A core layer (1.0-3.0 mm thickness) applied with bursting stitch-like slits (29 slits, each of about 0.7 cm length) was molded from each of core materials shown in Table 1 by using an inline screw two-color injection mold with a die clamping pressure of 350 ton. Then, a surface skin layer was injection molded by using each of a surface skin materials shown in Table 1 to a predetermined thickness on the core layer, to obtain a module cover 1 for air bag shown in FIG. 1.

In Example 4, coating was applied on the surface skin layer.

The coating was applied by wiping the surface skin layer with isopropanol after injection molding of the cover, spray-coating a primer manufactured by Sakai Kagaku Co (MEX5440 and methyl ethyl ketone at 1:1 ratio) to 7-10 um thickness, drying them at a room temperature for 10 min, then coating a urethane top coat manufactured by Sakai Kagaku Co. (MEX-6047: curing agent F-3L: thinner 58 u=100:10:50) to 20-25 $\mu$m thickness, drying them at a room temperature for 10 min and then applying baking at 80° C. for 30-45 min.

The resultant products were evaluated by the method to be described later and the results are shown in Table-2.

The materials used shown in Table 1 and the manufacturing methods are as follows.

Core Material

P$\phi$-1: Propylene-ethylene block copolymer resin (SPX 9800, manufactured by Mitsubushi Yuka Co.): MFR (230° C., 2.16 kg)=1 g/10 min, Modulus in flexure=4500 kg/cm$^2$ P$\phi$-2: Propylene-ethylene block copolymer resin (BC-8, manufactured by Mitsubushi Yuka Co.): MFR (230° C., 2.16 kg)=1.8 g/10 min, Modulus in flexure=10800 kg/cm$^2$ P$\phi$-3: Ethylene-propylene rubber (Ep07p, manufactured by Nippon Synthetic Rubber Co.) ML (100° C.)=70 Propylene content=27%

P$\phi$-4: Low pressure polyethylene resin (JX-20, manufactured by Mitsubushi Yuka Co.): MFR (190° C., 2.16 kg)=5.5 g/10 min, Modulus in flexure: 9000 kg/cm$^2$

Manufacturing Method for Core Material 100 parts by weight of the core material with the blending composition as shown in Table-1 was kneaded with addition of 0.2 parts of Illuganox 1010 manufactured by Ciba Geigy Co. as a stabilizer and 0.5 parts by weight of carbon black in a twine screw extruder at 200° C.

Surface Skin Material

Ingredient A

A-1: Hydrogenated derivative of styrene-butadiene block copolymer:
Styrene content=33 wt %
Number average molecular weight=180,000

A-2: Hydrogenated derivative of styrene-isoprene block copolymer:
Styrene content=13 wt %
Number average molecular weight=60,000

Ingredient B

B-1: The same material as P$\phi$-1 used the for core material

B-2: Propylene-ethylene block copolymer (BC1, manufactured by Mitsubushi Yuka Co.):
MFR (230° C., 2.16 kg)=30 g/10 min
modulus in flexure=10,000 kg/cm$^2$

Ingredient C

C-1: Polyisobutylene (TETRAX 3T, manufactured by Nippon Petrochemical Co.):
Viscosity average molecular weight=30,000

C-2: Polyisobutylene (TETRAX 5T, manufactured by Nippon Petrochemical Co.):
Viscosity average molecular weight=50,000
C-3: Polyisobutynene (VISTANEX MML-100, manufactured by Exon Chemical):
Viscosity average molecular weight=90,000
D-1: Paraffinic rubber softening agent (OIL) (pw380, manufactured by Idemitsu Kosan Co.):
Kinetic viscosity at 40° C.=380 cSt
D-2: Polybutene (Nisseki Polybutene HV-100, manufactured by Nippon Petrochemical Co.)
number average molecular weight=970

Manufacturing method for Surface Skin Material 100 parts by weight of each of the ingredients in a blending composition shown in Table 1 was kneaded with addition of 0.2 parts by weight of Illuganox 1010 and 0.5 parts by weight of carbon black used for the core material in a banbury type kneader at 180° C. for 20 min into a sheet-like form, which was then fabricated into square pellets by using a sheet cutter.

Comparative Example 7

For the comparison, an air bag-containing cover comprising two layers, that is, a surface skin layer made of high density urethane foams and a low density urethane core layer was manufactured and evaluated.

Molding was conducted by previously molding and curing a core layer at low foaming density by a RIM urethane molding process, placing the same in a die for forming a surface skin layer and, further, applying an insert molding process for molding a surface skin layer in the same method. Freon gas was used as the foaming material for the molding of the surface skin layer. The method required two curing steps and the productivity was poor.

The resultant air bag-containing cover was evaluated by the same method as in Example 1 and the results are shown in Table 2.

Comparative Example 8

For further comparison, an air bag-containing cover provided with reinforcing nets was manufactured and evaluated.

In this net-incorporated rim urethane molding, polyester fibers are braided into a net-like shape, which was cut by welding along the bursting shape of the cover and metal fixtures (hooks) were attached for molding two layers in the same way as in Comparative Example 7. They were placed in a rim die and applied with rim molding with urethane. In this case, Freon gas was used as the foaming material and, after mold releasing, cured at 100° C. for 30 min. This method involves drawbacks that preparation of a safety skin layer by the insertion of nets is difficult and the molding cycle was not effective.

The resultant air bag-containing cover was evaluated in the same method as in Example 1 and the results are shown in Table 2.

As apparent from Table 2, the air bag-containing covers according to the present invention shown in Examples 1-7 were excellent for the soft feeling, shape retainability, developing test at −40° C., endurance test at 110° C. for 500 hours and productivity.

Evaluation Method (1) Soft Feeling

As shown in FIG. 1, a module cover incorporated with an air bag 2, an air bag-containing cover 1, retainers (attaching metal) 4, 5 and an inflator 3, or a cover 1 alone was left at −20° C.-80° C. such that the temperature of the sample reached atmospheric temperature and the covers were evaluated by means of feeling of hands of 10 persons. Evaluation was made by the number of persons who sensed soft feeling and indicated by "o" if ten out of ten persons felt soft and "Δ" if 8 out of 10 persons felt soft. "x" means that the number of persons who felt soft was less than 8.

(2) Shape Retainability

A module cover attached with the air bag 2, the air bag-containing cover 1 and the retainer (metal fixtures) 4, 5 and the inflator 3 as shown in FIG. 1 or the cover 1 alone was left in the following heat cycles, i.e., 100° C.×4 hr→−40° C.×4 hr→85° C.×98% (RH)4 hr→−40° C.,4 hr for 10 cycles, and the state of deformation during or after the test was observed. (o) indicates suitability as the air bag-containing cover with scarce deformation and (x) means unsuitability as the air bag-containing cover with remarkable deformation.

(3) Developing Test at −40° C.

The assembled module in (1) and (2) above were attached to a steering wheel, left at −40° C. for such a time until reaching to the temperature of the atmosphere and the developing test was applied within one min after reaching. (x) means unsuitability as the air bag, not operating normally as the air bag, such as the module cover was cracked and scattered or the cover was cracked into sharp shapes to tear the bag and (o) means suitability showing that the air bag operated normally.

(4) Endurance Test at 110° C. for 1000 hours

After aging the module cover under the above-mentioned conditions by a gear type thermal aging tester, −40° C. developing test was applied in accordance with the test method in (3) above and, further, the appearance of the module cover was compared between before and after the aging. "x" means remarkable change such as warping, deformation and bleeding of the softening agent to the core material, while "o" means with no such changes.

(5) Productivity 20 products were manufactured successively and checked for the moldability (for example, mold releasability, or short shot), size and weight and, in particular, appearance of products for the surface skin layer (stickiness, delamination in the gate portion, appearance of weld, molding sink flow mark, appearance of grain, unevenness in luster, warping, or the like). "o" means that the products passed, "Δ" means that more than 90% of the products passed and "x" means that less than 90% of them passed the check.

TABLE 1

| | | Example | | | | | | | Comparative Example | | |
|---|---|---|---|---|---|---|---|---|---|---|---|
| | | 1 | 2 | 3 | 4 | 5 | 6 | 7 | 1 | 2 | 3 |
| Core Material | | | | | | | | | | | |
| Poly- | P φ - 1 | — | 40 | — | — | — | — | — | 50 | — | — |
| olefin | P φ - 2 | 40 | — | 50 | 40 | 40 | 40 | 40 | — | 80 | 40 |

TABLE 1-continued

| | | | | | | | | | | | |
|---|---|---|---|---|---|---|---|---|---|---|---|
| resin | P φ - 3 | 40 | 40 | 30 | 40 | 40 | 40 | 40 | 50 | — | 40 |
| blend | P φ - 4 | 20 | 20 | 20 | 20 | 20 | 20 | 20 | — | 20 | 20 |
| (pbw) | | | | | | | | | | | |
| Hardness (JIS - A) | | 98 | 96 | 99 | 98 | 98 | 98 | 98 | 88 | 99 | 98 |
| Bending in flexure (kg/cm²) | | 3900 | 2100 | 6500 | 3900 | 3900 | 3900 | 3900 | 800 | 10000 | 3900 |
| Blend of surface skin material (pbw) | | | | | | | | | | | |
| Ingredient A | A - 1 | 20 | 20 | 20 | 20 | 20 | 20 | 20 | 20 | 20 | 20 |
| | A - 2 | 45 | 43 | 43 | 45 | 35 | 45 | 50 | 45 | 45 | 45 |
| Ingredient B | B - 1 | 10 | — | 7 | 10 | — | 10 | 10 | 10 | 10 | 10 |
| | B - 2 | — | 12 | — | — | 20 | — | — | — | — | — |
| Ingredient C | C - 1 | 15 | 15 | 20 | — | 15 | 15 | 20 | 15 | 15 | — |
| | C - 2 | — | — | — | 15 | — | — | — | — | — | — |
| | C - 3 | — | — | — | — | — | — | — | — | — | 15 |
| Ingredient D | D - 1 | 10 | 10 | 10 | 10 | 10 | — | — | 10 | 10 | 10 |
| | D - 2 | — | — | — | — | — | 10 | — | — | — | — |
| (JIS - A) | | 52 | 61 | 43 | 55 | 75 | 57 | 60 | 52 | 52 | 60 |
| Remarks | | | | | surface skin coated | | | | | | |

| | | | Comparative Example | | | | |
|---|---|---|---|---|---|---|---|
| | | | 4 | 5 | 6 | 7 | 8 |
| Core Material | | | | | | | |
| Polyolefin resin blend (pbw) | P φ - 1 | | — | — | — | | |
| | P φ - 2 | | 40 | 40 | 40 | Urethane | Urethane |
| | P φ - 3 | | 40 | 40 | 40 | | |
| | P φ - 4 | | 20 | 20 | 20 | | |
| Hardness (JIS - A) | | | 98 | 98 | 98 | | |
| Bending in flexure (kg/cm²) | | | 3900 | 3900 | 3900 | | |
| Blend of surface skin material (pbw) | | | | | | | |
| Ingredient A | A - 1 | | — | 20 | 25 | | |
| | A - 2 | | 45 | 20 | 20 | | |
| Ingredient B | B - 1 | | 5 | — | 20 | | |
| | B - 2 | | — | 40 | — | | |
| Ingredient C | C - 1 | | 40 | — | 10 | | |
| | C - 2 | | — | 5 | — | | |
| | C - 3 | | — | — | — | | |
| Ingredient D | D - 1 | | 10 | 15 | 25 | | |
| | D - 2 | | — | — | — | | |
| (JIS - A) | | | 17 | 92 | 54 | | |
| Remarks | | | | | | foaming RIM | with reinforcement net |

TABLE 2

| | | Example | | | | | | | Comparative Example | | | | | | | |
|---|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 | 8 |
| Performance | | | | | | | | | | | | | | | | |
| Soft feeling | | ○ | ○ | ○ | ○ | ○ | ○ | ○ | X | ○ | X | ○ | X | ○ | △ | △ |
| Shape retainability | | ○ | ○ | ○ | ○ | ○ | ○ | ○ | X | ○ | X | X | ○ | ○ | ○ | ○ |
| Developing test at −40° C. | | ○ | ○ | ○ | ○ | ○ | ○ | ○ | X | ○ | ○ | ○ | ○ | X | ○ |
| Endurance test | Developing at −40° C. | ○ | ○ | ○ | ○ | ○ | ○ | ○ | X | ○ | ○ | ○ | X | ○ | ○ |
| | Appearance of product | ○ | ○ | ○ | ○ | ○ | ○ | ○ | ○ | ○ | ○ | ○ | X | X | ○ |
| Productivity | | ○ | ○ | ○ | ○ | ○ | ○ | ○ | ○ | X | X | ○ | ○ | ○ | X |

What is claimed is:

1. An air-bag-containing cover comprising:
a soft surface skin layer made of a thermoplastic blended polymeric material containing the following ingredients A, B, C and D:
ingredient A: a hydrogenated derivative of a block copolymer comprising styrene and conjugated diene,
ingredient B: an olefinic resin,
ingredient C: a polyisobutylene with a viscosity average molecular weight of not greater than 70,000, and
ingredient D: a hydrocarbon series rubber softening agent with a kinetic viscosity at 40° C. of not greater than 500 cSt and/or polybutene with a number average molecular weight of not greater than 2500, in which blending ratio is:
ingredient A = 40 to 80% by weight,
ingredient B = 5 to 30% by weight,
ingredient C = 2 to 30% by weight ingredient D=0 to 20% by weight, and having a JIS-A hardness according to JIS-K6301 of from 20 to 90, and a rigid core layer made of an olefinic resin having a modulus in flexure according to JIS-K7203 of from 1000 to 7000 kg/cm², in which said core layer has a hardness greater than that of said surface skin layer, and said core layer has a portion for easily bursting the cover upon initiation of the air bag operation.

2. A cover as defined in claim 1, wherein the portion for easily bursting the cover is notch-like formed by thin walled or portions or stitch-like slits disposed linearly.

3. A cover as defined in claim 1, wherein the ingredient A is a hydrogenated derivative of a styrenic block copolymer represented by the general formula:

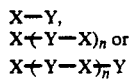

wherein X represents a polymer block of styrene, Y is an elastomeric polymer block of conjugated diene and n is an integer of 1 to 5.

4. A cover as defined in claim 3, wherein the monomer of the conjugated diene for the polymer block Y in each of the formula described above is butadiene or isoprene.

5. A cover as defined in claim 3, wherein the ratio of the styrene block polymer X in the entire block copolymer of the ingredient A is from 5 to 40% by weight.

6. A cover as defined in claim 3, wherein the number average molecular weight of the polymer block X is from 5000 to 125,000 and the number average molecular weight of the polymer block Y is from 15,000 to 250,000.

7. A cover as defined in claim 1, wherein the ingredient B is a homopolymer or copolymer of α-olefin selected from ethylene, propylene or butene-1.

8. A cover as defined in claim 1, wherein the hydrocarbon series rubber softening agent for the ingredient D is a paraffinic or naphthenic extender oil or process oil.

9. A cover as defined in claim 1, wherein the polybutene of the ingredient D comprises isobutylene and n-butene copolymerized therewith.

10. A cover as defined in claim 1, wherein the surface skin layer has a thickness from 0.5 mm to 10 mm for more than 70% of the surface area of the surface skin layer.

11. A cover as defined in claim 1, wherein the surface skin layer is formed by foaming a skin layer material at a ratio of less than about 3.0 times with an aim of improving the soft feeling and reduction of the weight.

12. A cover as defined in claim 1, wherein the olefinic resin for the core layer is a homopolymer or copolymer of α-olefin selected from ethylene or propylene.

13. A cover as defined in claim 1, wherein the core layer further includes an additional elastomer formed of an olefinic rubber comprising ethylene and an alpha-olefin.

14. A cover as defined in claim 1, wherein the core layer further includes an additional elastomer, the ratio of the additional elastomer to the total amount of the olefinic resin is less than 60% by weight.

15. A cover as defined in claim 1, wherein the thickness of the core layer is from 0.5 to 5 mm.

16. A cover as defined in claim 1, wherein the surface of the surface skin layer is covered with a coating.

17. A cover as defined in claim 1, wherein said cover has a breaking performance and appearance, which do not substantially change within a temperature between −40° C. and +80° C.

18. An air bag device comprising:
a base retainer,
an air bag attached to said base retainer,
an inflator attached to said base retainer so as to inject a gas into the air bag to rapidly develop said air bag, and
a cover for covering the air bag and secured to the base retainer, said cover comprising:
a soft surface skin layer made of a thermoplastic blended polymeric material containing the following ingredients A, B, C and D:
ingredient A: a hydrogenated derivative of a block copolymer comprising styrene and conjugated diene,
ingredient B: an olefinic resin,
ingredient C: a polyisobutylene with a viscosity average molecular weight of not greater than 70,000, and
ingredient D: a hydrocarbon series rubber softening agent with a kinetic viscosity at 40° C. of not greater than 500 cSt and/or polybutene with a number average molecular weight of not greater than 2500, in which blending ratio is:
ingredient A=40 to 80% by weight,
ingredient B=5 to 30% by weight,
ingredient C=2 to 30% by weight,
ingredient D=0 to 20% by weight, and
having a JIS-A hardness according to JIS-K6301 of from 20 to 90, and
a rigid core layer made of an olefinic resin having a modulus in flexure according to JIS-K7203 of from 1000 to 7000 kg/cm², in which
said core layer has a hardness greater than that of said surface skin layer, and said core layer has a portion for easily bursting the cover upon initiation of the air bag operation.

* * * * *